United States Patent [19]

Bridges et al.

[11] 4,130,793

[45] Dec. 19, 1978

[54] DIELECTRIC WELL LOGGING MEANS AND METHOD UTILIZING THE SIGNALS FROM A PAIR OF RECEIVERS FOR PROVIDING CLOCK PULSES CORRESPONDING TO EARTH FORMATION DIELECTRIC CONSTANT

[75] Inventors: James R. Bridges; Roland G. Riedesel, Jr.; Larry W. Thompson, all of Houston, Tex.

[73] Assignee: Texaco Inc., New York, N.Y.

[21] Appl. No.: 755,317

[22] Filed: Dec. 29, 1976

[51] Int. Cl.² .......................... G01V 3/18; G01V 3/10; G01R 25/00

[52] U.S. Cl. ...................................... 324/6; 324/83 D

[58] Field of Search ................. 324/6, 83 R, 83 D, 85

[56] References Cited

U.S. PATENT DOCUMENTS

| | | | |
|---|---|---|---|
| 3,096,480 | 7/1963 | Pihl | 324/83 A |
| 3,551,797 | 12/1970 | Gouilloud et al. | 324/6 |
| 3,553,579 | 1/1971 | Teixeira | 324/83 D |
| 3,562,646 | 2/1971 | Maxwell et al. | 324/85 |
| 3,663,956 | 5/1972 | Purdy et al. | 324/83 D |
| 3,849,721 | 11/1974 | Calvert | 324/6 |
| 4,012,689 | 3/1977 | Cox et al. | 324/6 |

FOREIGN PATENT DOCUMENTS 212387 10/1969 U.S.S.R. .................................. 324/6

Primary Examiner—Gerard R. Strecker
Attorney, Agent, or Firm—Thomas H. Whaley; Carl G. Ries; Ronald G. Gillespie

[57] ABSTRACT

Electrical energy is induced into an earth formation by a transmitter in apparatus, adapted to be passed through a borehole traversing the earth formation. Clock pulses are also provided in the apparatus. At least two receivers provide signals corresponding to received electrical energy from the earth formation. A gating circuit provides groups of clock pulses in accordance with the signals from the receivers so that the number of clock pulses in each group corresponds to the dielectric constant of the earth formation.

10 Claims, 2 Drawing Figures

DIELECTRIC WELL LOGGING MEANS AND METHOD UTILIZING THE SIGNALS FROM A PAIR OF RECEIVERS FOR PROVIDING CLOCK PULSES CORRESPONDING TO EARTH FORMATION DIELECTRIC CONSTANT

BACKGROUND OF THE INVENTION

1. Field of the Invention

The present invention relates to well logging systems and methods in general and, more particularly, to a dielectric well logging system and method.

2. Description of the Prior Art

In a previous system, the output from an AND gate was applied to an integrator which integrated the voltage. However, due to the high temperature variations present in borehole well logging, considerable drift was experienced from that type of a measuring device. The present invention represents an improvement over the aforementioned device since its output is not adversely affected by temperature in the borehole. Further, better resolution of measurement can be obtained using the present invention.

SUMMARY OF THE INVENTION

Well logging apparatus adapted to be passed through a borehole traversing an earth formation includes a pulse source which provides clock pulses at a predetermined frequency. Also included in the apparatus is a transmitter which induces electrical energy into the earth formation at a radio frequency. A network provides a local frequency signal. Each receiver of at least two receivers in the apparatus provides an intermediate frequency signal corresponding to electrical energy received from the earth formation in accordance with the local signal. The signal from each receiver is provided to a corresponding detector which provides a signal whose changes in amplitude are representative of the signal from the receiver passing through a zero level. A gating circuit receives the clock pulses and is controlled by the signals from the detectors to provide groups of clock pulses. The number of clock pulses in each group corresponds to the dielectric constant of the earth formation.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE INVENTION

Figure 1:
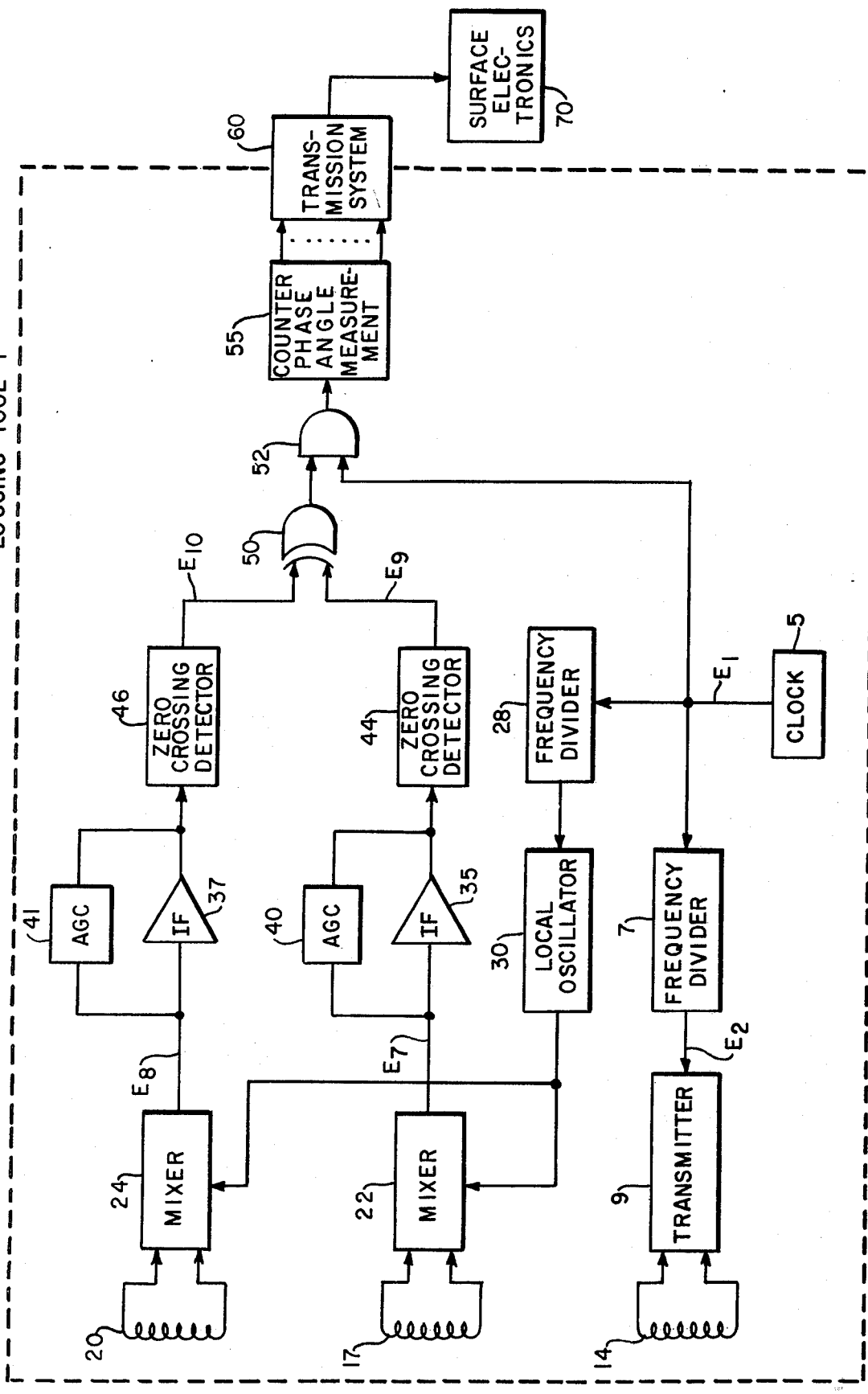
FIG. 1 is a simplified block diagram of dielectric well apparatus constructed in accordance with the present invention.
Figure 2:
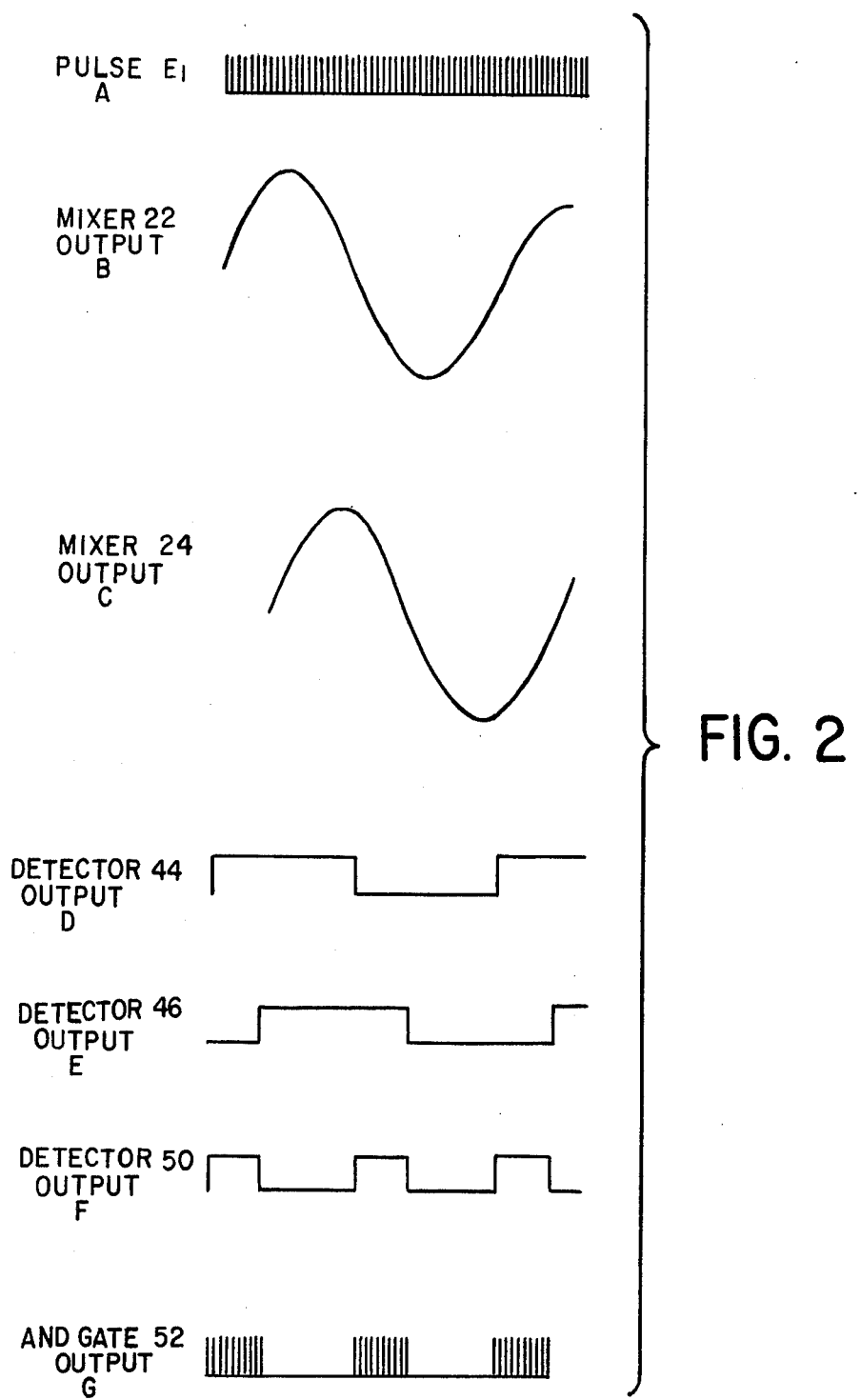
FIGS. 2A through 2G are graphical representations of voltages occurring in the apparatus shown in FIG. 1 during its operation.

Referring to FIG. 1, there is shown a logging tool 1 which is adapted to be passed through a borehole traversing an earth formation. Within logging tool 1, there is a temperature stable phase shift monitor including a clock 5 providing pulses E1, shown in FIG. 2A, at a predetermined frequency. The frequency of clock 5 is chosen so that it is much greater than the IF frequencies. One such frequency selected is 122 megahertz.

Pulses $E_1$ are provided to a frequency divider 7 which provides pulses $E_2$, having a suitable frequency, to a transmitter 9. Divider 7 may be divide by 61 type divider so as to provide pulses $E_2$ at a frequency of 2 megahertz. Transmitter 9 energizes a transmitting coil 14 which induces electrical energy into the earth formation.

Receiving coils 17 and 20 spaced a predetermined distance from each other receive the electrical energy conducted through the earth formation and provide corresponding signals to mixers 22 and 24, respectively. The phase shift between the received electrical energy is related to the dielectric constant of the earth formation.

Pulses $E_1$ from clock 5 are also applied to another frequency divider 28 which divides them down to a suitable frequency for use by local oscillator 30. A suitable division would be a divide by 60 so that local oscillator 30 provides a beat frequency of 2.033333 megahertz to mixers 22 and 24. Oscillator 30 and mixers 22 and 24 superhetrodyne the signals from coils 17 and 20 to provide corresponding signals $E_7$ and $E_8$, shown in FIGS. 2B and 2C, respectively, to IF amplifiers 35 and 37, respectively. Automatic gain control feedback networks 40 and 41 connected across the outputs and inputs of amplifiers 35 and 37, respectively. Signals from IF amplifiers 35 and 37 are applied to zero crossing detectors 44 and 46, respectively, which provides signals $E_9$ and $E_{10}$, respectively, shown in FIGS. 2D and 2E, respectively. As can be seen, a signal from a detector changes amplitude when the signal from a corresponding IF amplifier pass through a zero level. Signals $E_9$, $E_{10}$ are applied to an exclusive OR gate 50, causing exclusive OR gate 50 to provide the output shown in FIG. 2F. The output from exclusive OR gate 50 enables an AND gate 52 receiving pulses $E_1$. When exclusive OR gate 50 provides a high level output to AND gate 52, AND gate 52 passes pulses $E_1$ to a counter 55. The count in counter 55 corresponds to the width of the output pulses from exclusive OR gate 50 and hence to the phase shift between signals being received by coils 17 and 20.

Counter 55 provides digital signals corresponding to the count to a transmission system 60 for transmission to the surface. Transmission system 60 may be of a type described and disclosed in U.S. application No. 750,746 filed on Dec. 15, 1976. The transmitted signal is processed by electronics 70, which may be a conventional type, to provide an output corresponding to the phase shift detected in the borehole.

The present invention hereinbefore described is a phase shift measuring device for use in dielectric logging in the borehole traversing an earth formation.

What is claimed is:

1. Well logging means adapted to be passed through a borehole traversing an earth formation and for providing a signal corresponding to the dielectric constant of the earth formation comprising pulse means for providing clock pulses at a predetermined frequency substantially greater than the intermediate frequencies; first dividing means connected to the pulse means for providing transmit pulses at a substantially lower frequency than the clock pulses; transmitter means connected to the first divider means for inducing electrical energy into the earth formation at a radio frequency in accordance with the transmit pulses; second dividing means connected to the pulse means for providing beat pulses at a substantially lower frequency than the clock pulse but slightly greater than the frequency of the transmit pulses; at least two receiver means spaced a predetermined distance from each other, each receiver means includes receiver network means connected to the second dividing means for providing a signal, at an intermediate frequency, corresponding to received electrical energy from the earth formation in accordance with the beat pulses, and detector means, each detector means being connected to a corresponding receiver network means for providing a signal whose change in amplitude is representative of the signal from the receiver network means passing through a zero level; an exclusive OR gate connected to both detector means provides a gate signal at one amplitude when the signals from the detector means have different amplitudes and at another amplitude when the signals from the detector means have substantially the same amplitude; an AND gate connected to the pulse means and to the exclusive OR gate is controlled by the gate signal from the exclusive OR gate to pass the clock pulses when the gate signal from the exclusive OR gate is of the one amplitude and to block the clock pulses when the gate signal from the exclusive OR gate is of the other amplitude so as to provide groups of pulses wherein the number of pulses in each group corresponds to the dielectric constant of the earth formation; counter means connected to the AND gate for counting the pulses in each group of pulses so that its count corresponds to the dielectric constant of the earth formation; and means connected to the counter means for providing the signal corresponding to the dielectric constant of the earth formation in accordance with the count in the counter means.

2. Well logging means as described in claim 1 in which the transmitting means includes a first coil, and transmitter circuit means connected to the coil and to the first frequency divider means for energizing the first coil in accordance with the transmit pulses from the first frequency divider means so as to induce the electrical energy into the earth formation.

3. Well logging means as described in claim 2 in which the signal means includes means connected to all the receiver network means and to the second frequency divider means for providing a local frequency signal to the receiver network means in accordance with the pulses from the second frequency divider means.

4. Well logging means as described in claim 3 in which the first dividing means divides the clock pulses by a factor of 61, and the second dividing means divides the clock pulses by a factor of 60.

5. Well logging means as described in claim 4 in which the clock pulses have a frequency of 122 megahertz.

6. A well logging method for use in a borehole traversing an earth formation so as to provide a signal corresponding to the dielectric constant of the earth formation comprising providing clock pulses at a predetermined frequency substantially greater than the intermediate frequencies; first dividing the clock pulses to provide transmit pulses at a substantially lower frequency than the clock pulses; inducing electrical energy into the earth formation at a radio frequency in accordance with the transmit pulses; second dividing the clock pulses to provide beat pulses at a substantially lower frequency than the clock pulses but slightly greater than the frequency of the transmit pusles; receiving the induced electrical energy at two different locations in the borehole, providing intermediate frequency receiver signals corresponding to the received electrical energy from the earth formation in accordance with the beat pulses, providing detector signals on a one-to-one basis with the receiver signals whose change in amplitude is representative of a corresponding receiver signal passing through a zero level; providing a gate signal at one amplitude when the detector signals have different amplitudes and at another amplitude when the detector signals have substantially the same amplitude; passing the clock pulses when the gate signal is of the one amplitude and blocking the clock pulses when the gate signal is of the other amplitude so as to provide groups of pulses wherein the number of pulses in each group corresponds to the dielectric constant of the earth formation; counting the pulses in each group of pulses to provide counts corresponds to the dielectric constant of the earth formation; and providing the signal corresponding to the dielectric constant of the earth formation in accordance with the counts.

7. A well logging method as described in claim 6 in which the inducing step includes energizing a first coil in accordance with the transmit pulses so as to induce the electrical energy into the earth formation.

8. A well logging method as described in claim 7 in which local frequency signal step includes providing a local frequency signal in accordance with the beat pulses to control the receiving of the induced electrical energy.

9. A well logging method as described in claim 8 in which the first dividing step divides the clock pulses by a factor of 61, and second dividing step divides the clock pulses by a factor of 60.

10. A well logging method as described in claim 9 in which the clock pulses are provided at a frequency of 122 megahertz.

* * * * *